United States Patent
Knecht et al.

(10) Patent No.: US 6,742,936 B1
(45) Date of Patent: Jun. 1, 2004

(54) LOW-LOSS INTERMATABLE FERRULES FOR OPTICAL FIBERS AND A METHOD OF FABRICATION THEREOF

(75) Inventors: Dennis M. Knecht, Hickory, NC (US); James P. Luther, Hickory, NC (US); Otto I. Szentesi, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 367 days.

(21) Appl. No.: 09/706,913

(22) Filed: Nov. 6, 2000

(51) Int. Cl.$^7$ ................................................. G02B 6/38
(52) U.S. Cl. ........................................... 385/67; 385/52
(58) Field of Search ............................. 385/62, 78, 52, 385/60, 66, 67

(56) References Cited

U.S. PATENT DOCUMENTS

| | | | | |
|---|---|---|---|---|
| 4,708,433 A | * | 11/1987 | Kakii et al. | 385/54 |
| 4,738,508 A | * | 4/1988 | Palmquist | 385/78 |
| 4,877,303 A | * | 10/1989 | Caldwell et al. | 385/55 |
| 4,880,291 A | * | 11/1989 | Aberson, Jr. et al. | 350/96.21 |
| 5,825,958 A | * | 10/1998 | Gollihar et al. | 385/125 |
| 5,852,694 A | * | 12/1998 | Kimura et al. | 385/78 |

FOREIGN PATENT DOCUMENTS

| | | | | |
|---|---|---|---|---|
| EP | 0327267 A2 | | 1/1989 | G02B/6/38 |
| EP | 0 909 967 A1 | * | 4/1999 | G02B/6/36 |
| JP | 55-069114 | * | 5/1980 | G02B/7/26 |
| JP | 57-185407 | * | 11/1982 | G02B/7/26 |
| JP | 63-172106 | * | 7/1988 | G02B/6/36 |
| JP | 63-228108 | * | 9/1988 | G02B/6/36 |

OTHER PUBLICATIONS

Tool and Manufacturing Engineers Handbook, "Society of Manufacturing Engineers", Fourth Edition, (1987), pp. 3–52 through 3–59, 4–11, 4–13, 4–15, 4–16, 4–17, 4–24 through 4–28.*

Lowell W. Foster, Geo–Metrics II As Based Upon ANSI Y14.5M–1982 Practices, "The Application of Geometric Tolerancing Techniques (using customary inch system)", revised 1986 edition, pp. 292–297.*

N. Suzuki et al., "A New Demountable Connector Developed For A Trial Optical Transmission System", IOOC, B10–4, (1977), pp. 351–354.*

H.J. Hogan, "Rotary Splice Aligns Optical Fibers Quickly, Accurately", Design News, Jun. 17, 2985, 2 pages.*

Y. Koyama et al., "Development and Application of Precision Optical Fiber Connectors", Bull, Japan Soc. of Prec. Engg., vol. 15, No. 3, Sep. 1981, pp. 155–159.*

G. Khoe et al., Single–Mode Fiber Connector Using Core–Centered Ferrules, IEEE Transactions on Microwave Theory and Techniques, vol. MTT–30, No. 10, Oct. 1982, pp. 1561–1567.*

C.M. Miller, "Optical Fiber Splices and Connections Theory and Methods", Marcel Dekker, Inc., (1986), pp. 377–389.*

T. Karaki–Doy et al., "Development of A New Automatic Processing Machine for Optical–Fiber Connector Ends", Bull, Japan So. of Prec. Engg., vol. 22, No. 3, Sep. 1988, pp. 216–217.*

Yangi et al., Injection Moulded Plastic Ferrules for Singlemode Optical Fibre Connections; Electronics Letters, IEE Stevenage, GB, vol. 35, No. 1, Jan. 7, 1999.*

Patent Abstract of Japan, 63228108, Sep. 22, 1988.

Patent Abstract of Japan, 63172106, Jul. 15, 1988.

Yanagi et al.; Injection Moulded Plastic Ferrules for Singlemode Optical Fibre Connections; Electronics Letters, IEE Stevenage, GB, vol. 35, No. 1, Jan. 7, 1999.

* cited by examiner

*Primary Examiner*—Edward J. Glick
*Assistant Examiner*—Chih-Cheng Glen Kao (57) ABSTRACT

A method for assembling a population of ferrules to minimize the eccentricity of the fibers typically includes the steps of selecting a set of ferrules, determining the eccentricity of the ferrules, selecting a fiber, inserting the fiber within the ferrule bore, orienting the fiber within the ferrule, and securing the fiber in place. The result is a population of ferrules that can be mated with little or no insertion loss.

34 Claims, 7 Drawing Sheets

LOW-LOSS INTERMATABLE FERRULES FOR OPTICAL FIBERS AND A METHOD OF FABRICATION THEREOF

FIELD OF THE INVENTION

The present invention relates generally to optical fiber connectors and a method for orienting the optical fiber within the bore of a ferrule of a fiber optic connector to create a population of ferrules and connectors with improved mating characteristics.

BACKGROUND OF THE INVENTION

Optical fibers are widely used in a variety of applications, including the telecommunications industry. For example, optical fibers not only serve as a medium for long distance signal transmission, but are being increasingly routed directly to the home or, in some instances, directly to the desk or another work location.

With the increasing use of optical fibers, an efficient means of coupling fibers, such as to other optical fibers, to a patch panel in the central office or office building, or to various remote terminals or pedestals is required. However, in order to efficiently couple the signals transmitted by the respective optical fibers, an optical fiber connector must not significantly attenuate or alter the transmitted signals.

A number of factors affect the performance of mated optical fiber connectors. These include surface finish of the optical fiber in the connector and the alignment of the optical fiber of one connector with the optical fiber of a second connector and, more specifically, the alignment of the cores of the respective fibers. The loss or attenuation of an optical fiber with a 50 micrometer core diameter due to surface reflection is about 0.3 dB and is also about 0.3 dB due to offset, or lateral displacement. See Y. Koyama et al., Development and Application of Precision Optical Fiber Connectors, Bull. Japan Soc. of Prec. Eng., Vol. 15, No. 3 (Sep. 1981). Various methods, including mechanical polishing alone or in combination with laser polishing as are well-known in the art, have been developed to improve the surface finish of the fiber, thereby reducing attenuation as shown, for example, in U.S. Pat. No. 5,317,661 to Szentesi et al. Developing efficient and economical methods to minimize lateral displacement of mated fiber cores with respect to each other has been, however, more elusive.

Lateral displacement or offset of fiber cores of mated connectors results from the contribution of three factors: (1) eccentricity of the ferrule bore with respect to the ferrule's outside surface, (2) eccentricity of the fiber core relative to the fiber cladding, and (3) differences in the outside diameter of the fiber and the inside diameter of the bore of the ferrule in which the fiber is set. While the quality of ferrules has improved over time, ferrules are not perfectly concentric, i.e., the central axis of the cylindrical bore does not coincide with the central axis of the outside surface of the ferrule. Furthermore, the degree of eccentricity varies in a large population of ferrules, some being more eccentric, i.e., less concentric, than others. Similarly, the inside diameter of the ferrule bores in a large population of ferrules varies within certain limits, about 125.0–126.0 µm, so that the fiber does not fit tightly within the ferrule bore, thereby adding to the overall lateral displacement of the core of the optical fiber relative to the outside of the ferrule. Of three factors discussed above, the eccentricity of the fiber core relative to the cladding is the least significant contributing factor to overall eccentricity of the fiber optic connector.

An early method of minimizing overall connector eccentricity, i.e., centering the fiber within the ferrule, is disclosed by N. Suzuki et al., "A New Demountable Connector Developed For A Trial Optical Transmission System, p. 351–354, IOOC 1977. This method involved minimizing the eccentricity of connectors comprised of a fiber, a stainless steel plunger, a glass tube, and a stainless steel pivot. The plunger is machined and polished to a outside diameter of 2.499 mm with a 0.001 mm accuracy and a roundness of 0.6 microns. Unlike ferrules presently being used, however, the plunger has a large bore for receiving the stainless steel pivot. The optical fiber is inserted in a glass tube filled with epoxy resin. The glass tube is then inserted into the stainless steel pivot which is also filled with epoxy resin. After the epoxy is cured, the pivot is polished. Using a microscope, TV camera and monitor, V groove or V block, micromanipulator, and dummy plunger (alignment jig), the fiber is centered inside the plunger with respect to the outside surface of the plunger. First, the jig is placed in the V groove and positioned using the micromanipulator so that by rotating the jig, markers on the jig trace concentrically along a target circle drawn on the screen. The connector plunger then replaces the dummy plunger in the V groove, and the pivot containing the optical fiber is inserted into the plunger. The pivot is then moved by the micromanipulator until the core of the fiber is centered in the target circle on the monitor, thereby positioning the fiber at the center of the plunger. This method is expensive, time consuming, and not suitable for mass production of connectors.

Another example is U.S. Pat. No. 4,880,291, entitled "Optical Fiber Connector and Methods of Making." That patent discloses two ferrules to be used in a connector that are provided from contiguous portions of the same tubular preform. Prior to separation of the ferrules from the preform, the free end portion of each ferrule (called plugs in the patent) is mounted in a connector body. The connectors are provided with a tab and the connectors are attached to the ferrules so that tabs are aligned longitudinally. As a result, the end faces of the ferrules that were once contiguous can then be aligned longitudinally when mated and the fibers in the ferrules will also be aligned. However, this method does not allow for alignment of ferrules that are not from the same preform. These connectors also require that the installers keep the connectors paired to each other. If one connector is bad or must be changed, then both connectors must be discarded/changed. This increases not only the costs, but the number of paired connectors the installers must carry at each job site.

Other methods have attempted to center the optical fiber within the ferrule differently. For example, one method, disclosed by G. Khoe in "Single-Mode Fiber Connector Using Core-Centered Ferrules", IEEE Transactions On MicroWave Theory And Techniques, Vol. MT-30, No. 10, October 1982, is to first glue the fiber into a ferrule without regard to the position of the fiber relative to the outer surface of the ferrule. A special lathe, comprising a micromanipulator, an optical alignment system, and a diamond cutter, is then used to cut down the ferrule outer surface until the fiber is centered within the ferrule. Again, this method is not cost-effective, nor suited to mass production.

More recent assembly methods have focused on assembling the optical fiber within the ferrule, and then orienting the resulting total offset relative to a key on the ferrule. Because the eccentricity errors are positioned randomly, these errors can result in very high total offset, i.e., the eccentricity of the ferrule bore relative to the outer surface of the bore and the eccentricity of the optical fiber relative to the bore may be oriented in the same direction resulting in a large offset of the fiber relative to the outer surface of the ferrule. The attenuation of the signal introduced by the offset is somewhat reduced when mating the connector with a second connector by mating the connectors in various orientations until the lowest attenuation is achieved. This process is expensive and is limited in effectiveness by the size of the resulting offset distribution. The typical connector alignment hardware is capable of only coarse adjustments (typically 90° to 180°) that make it difficult and expensive to obtain maximum performance from the fiber optic connector. Furthermore, the process of determining the offset by repeated mating and de-mating results in wear and tear on the connector.

Alternatively, the concentricity tolerance of the bore of the ferrule may be determined with respect to the outer surface of the ferrule. Concentricity tolerance (referred to hereinafter as "concentricity") is the diameter of the cylindrical tolerance zone within which the axis of the features, in this case the central axis of the ferrule bore, must lie. See L. Foster, Geo-Metrics II 292-97 (1986); 4 Tool and Manufacturing Engineers Handbook, chapt. 4 (C. Wick and R. Veilieux eds. 1987). The measure of concentricity is therefore twice the measure of eccentricity. Once the concentricity of the bore relative to the ferrule is determined, the direction of concentricity is determined and marked with a key, thereby allowing connectors to be mated with the concentricity in the same direction, i.e., reducing offset of the cores of the fibers in the connectors.

Therefore, while methods exist for centering the optical fiber in a ferrule, they are slow, expensive, and not suitable for use in an assembly line used to mass produce connectors. As a result, no cost effective, commercial process presently exists that centers the fiber relative to the outer surface of the ferrule of a connector. The present method of orienting the concentricity, or offset of the fiber with respect to the ferrule surface, is not satisfactory because it does not correct or eliminate the concentricity but merely attempts to orient the concentricity of each ferrule with respect to a key so that the concentricities of mated ferrules are oriented in the same direction to minimize the offset of the fiber cores to the greatest extent possible. Because the magnitude of the concentricities or eccentricities can vary significantly from ferrule to ferrule, simply orienting the concentricities in a known direction does not permit the optical fiber to readily align with the optical fiber of another connection. Thus, the current methods do not meet the increasing demands for connectors having minimal attenuation losses.

SUMMARY OF THE INVENTION

Accordingly, the present invention is directed to low-loss intermatable ferrules that substantially obviate one or more of the problems due to the limitations and disadvantages of the related art.

To achieve this and in accordance with the purpose of the invention, as embodied and described, the invention is directed to a method of making a population of intermatable ferrules, each of the ferrules being mounted on an optical fiber, and each ferrule having an outer surface and defining a longitudinal bore, comprising the steps of selecting from a first set of ferrules a second set of ferrules with a bore having a predetermined eccentricity and a predetermined inner diameter, the eccentricity of the bore relative to the outer surface of each of the ferrules, providing an optical fiber, the optical fiber having an outer diameter smaller than the inner diameter of the ferrule bore, and positioning an optical fiber in the bore of each of the ferrules on the basis of the eccentricity so the fiber is generally concentric relative to the outer surface of the ferrule.

In another aspect, the invention is directed to a population of independent, intermatable cylindrical ferrules including a plurality of cylindrical ferrules having an outer surface and a longitudinal bore, the bore having an inner diameter, a center point, and a cylindrical wall of varying thickness between the bore and the outer surface; and an optical fiber having a core and a cladding, the core having a center and the cladding having an outer diameter, the optical fiber mounted in the bore of each of the ferrules against wall with a portion having the greatest thickness, whereby the center of the optical fiber core is positioned within a predetermined range of the center of the ferrule.

In yet another aspect, the present invention is directed to a population of independent, intermatable ferrules that includes a plurality of ferrules, each of the ferrules having an outer surface and a longitudinal bore, the bore having a predetermined inner diameter and an eccentricity relative to the outer surface, an optical fiber mounted in the bore of each of the ferrules generally concentric relative to the outer surface of the ferrule, whereby when any two ferrules of the population of ferrules are mated in a connector sleeve, centers of the optical fibers are offset less than a predetermined value relative to one another.

In yet another aspect, the present invention is directed to a population of independent, intermatable ferrules including a plurality of ferrules having an outer surface and a longitudinal bore, the bore having an eccentricity relative to the outer surface, a optical fiber mounted in the bore of each of the ferrules generally concentric relative to the outer surface of the ferrule, whereby when any two ferrules of the population of ferrules are mated in a connector sleeve, the mating point has a signal loss less than a predetermined value.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention of those skilled in the art. Like numbers refer to like elements throughout.

Applicants have discovered a quick, cost effective method of minimizing the eccentricity or concentricity of fiber optic connectors that is suitable for mass production. This method can be used in place of or in conjunction with present methods of orienting the offset in a known direction by mounting a key on a ferrule or ferrule holder. Fiber optic connectors made according to this new method exhibit a substantial reduction in attenuation, from about 0.3 dB to less than 0.1 dB, due to less fiber-to-fiber offset. The method of the present invention lends itself to mounting an optical fiber in the ferrule during an assembly process so that the assembly of the optical fiber can be standardized, thereby avoiding inconsistent assembly and other problems associated with field installation of connectors.

Figure 1:
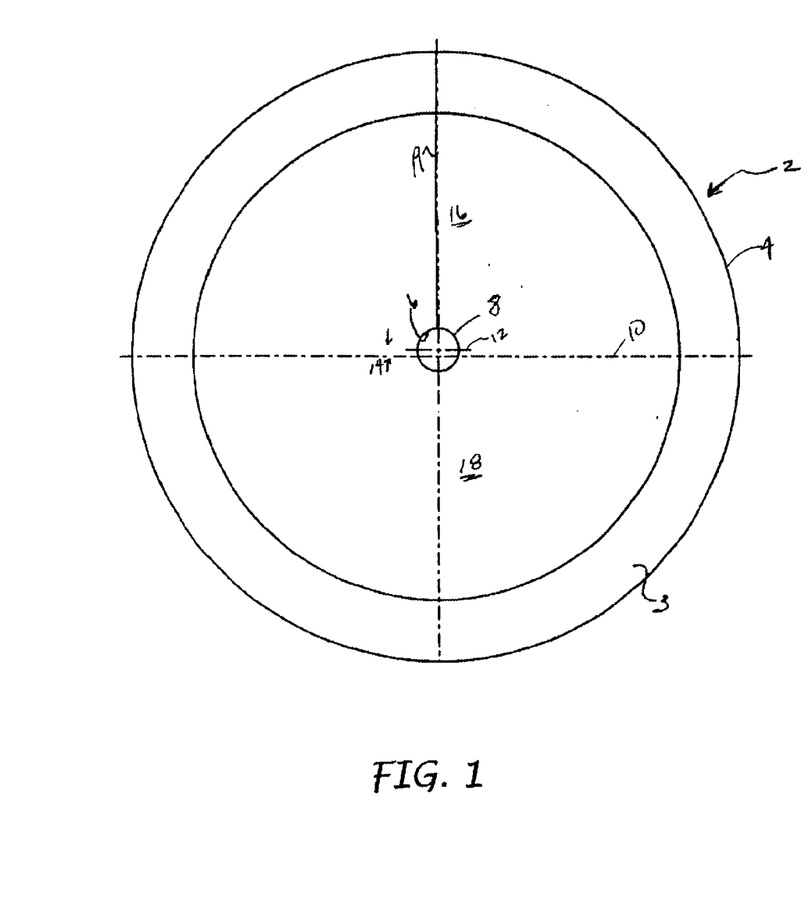
FIG. 1 is a front view of a ferrule illustrating the concentricity and eccentricity of the bore with respect to the outer surface of the ferrule.
Figure 2:
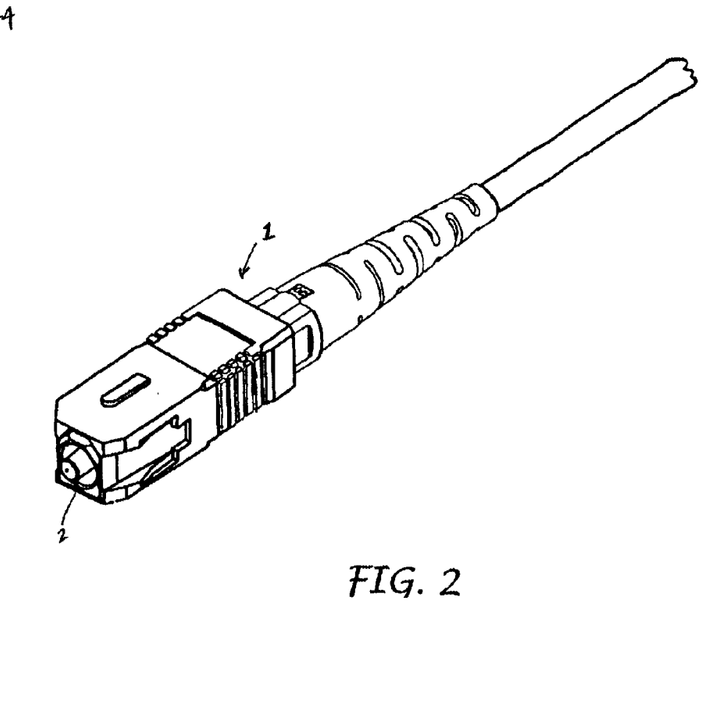
FIG. 2 is a perspective view of a ferrule in connector.

Referring to FIG. 1, a ferrule 2 fabricated according to the method of the present invention is shown and is used in a connector 1 as shown in FIG. 2. An SC connector made by Corning Cable Systems is shown in FIG. 2, but the ferrule could be used in any configuration of optical connector, including, for example, an SC, FC, etc. The ferrule 2, which is shown in the figures as having a chamfer 3 around the front edge of the ferrule, may be made of zirconia but may also be made of any suitable material such as metal or plastic. The ferrule 2 also need not have the chamfer 3, although it is preferred to prevent the skiving of the ferrule when inserted into a sleeve or mated with another ferrule. The ferrule 2 includes an outer surface 4 and an inner surface 6 that defines a fiber bore 8. The outer surface 4 generally has an outer diameter of 2.499 mm. The fiber bore 8 has a diameter from about 125 to 126 microns ($\mu$m). The present invention is not limited, however, to orienting optical fibers in ferrules of any specific size and may include an LC connector.

The specified concentricity of ferrules used in conventional fiber optic connectors is usually from 0 to 1 $\mu$m. Thus, the bores of these ferrules are generally not concentric with the outer surface of the ferrule. In other words, the central longitudinal axis 10 of the outer surface of the ferrule is offset from the central longitudinal axis 12 of the fiber bore 8 by distance 14. This distance is referred to as the offset or eccentricity of the bore within the ferrule. The concentricity of the ferrule is equal to twice the eccentricity and, therefore, concentricity and eccentricity are generally interchangeable for the purpose of practicing the present invention. As a result of the eccentricity of the ferrule, a portion of the ferrule wall 16 is the thinnest in the direction of the eccentricity. Conversely, a section of the ferrule wall 18 is thickest at a point 180 degrees from the thinnest portion section 16 of the wall. In the figures and in the preferred embodiment, the thinnest portion 16 of the wall is oriented upward, but could be oriented in any direction, as long as the optical fiber is oriented in a direction to cancel the effects of the ferrule offset, as discussed in detail below. Applicants have found that the orientation of the ferrule is best such that a line 19 from the center of the fiber bore 8 to a point on the outer surface 4 at the thinnest portion of the ferrule generally points upward (as used herein, upward, downward, left, right generally mean in the direction when looking at the ferrule from the end face, but should not be used in any limiting manner). However, the line 19 (and consequently the eccentricity) should preferentially be oriented within 90° of upward (or the direction of choice), more preferably within 30°(19'), and most preferably within 5°(19"). See FIG. 4.

Figure 3:
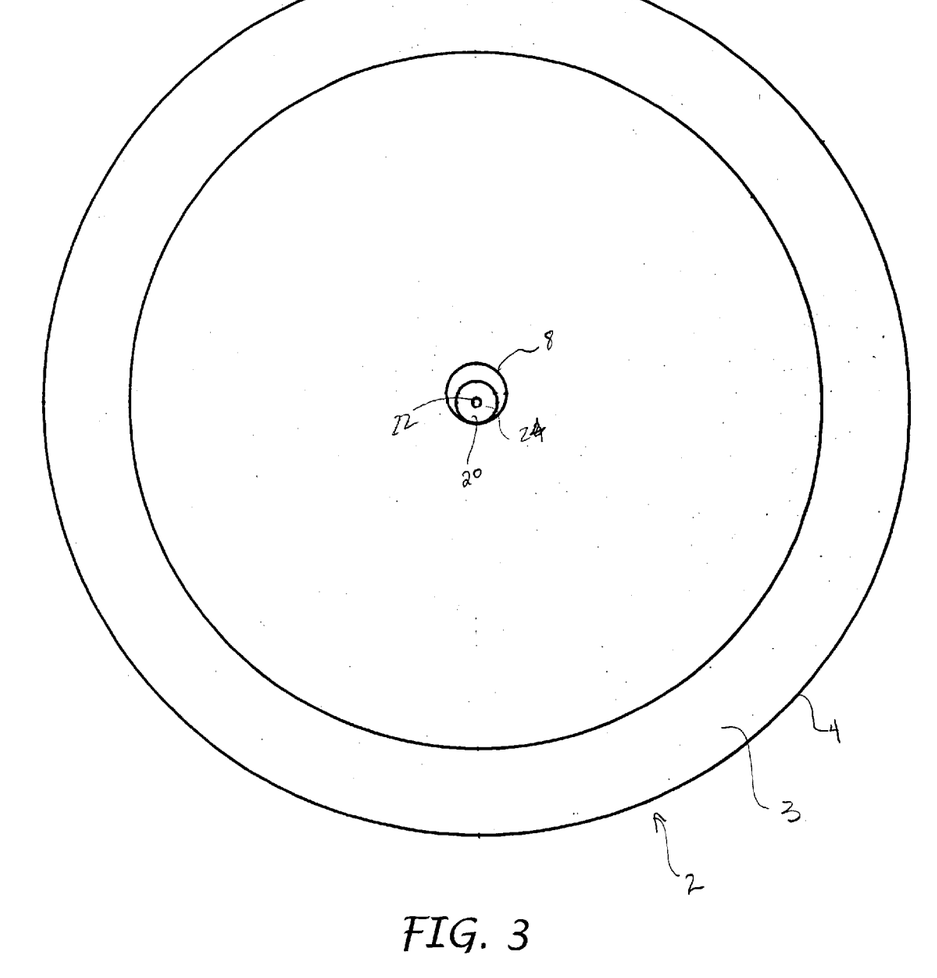
FIG. 3 is a front view of a ferrule illustrating the concentricity and eccentricity of an optical fiber in the bore of the ferrule.
Figure 4:
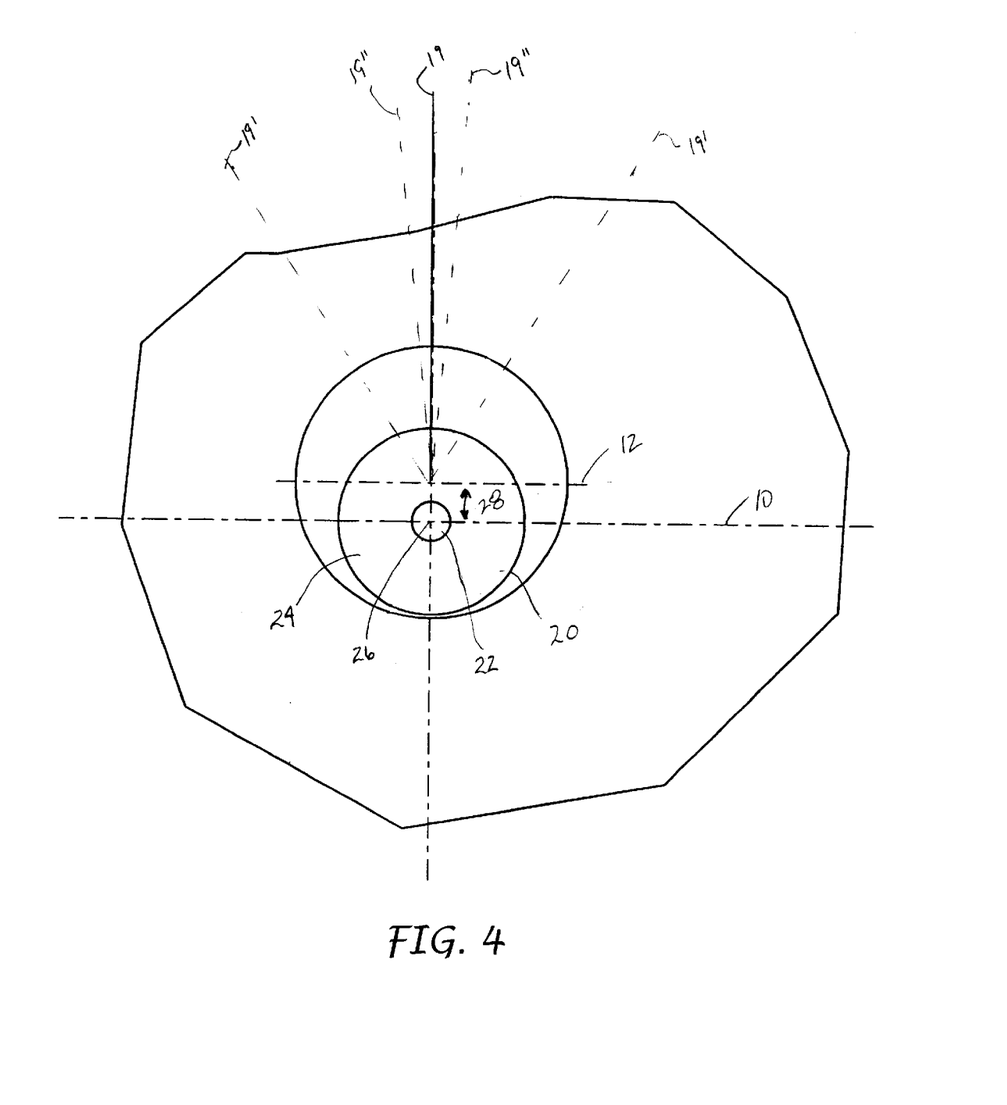
FIG. 4 is a front partial view of the ferrule and optical fiber of FIG. 3 illustrating the method of the present invention wherein the fiber is positioned in the bore in order to offset the effect of the eccentricity of the bore relative to the outer surface of the ferrule on mated connectors.

Referring to FIGS. 3 & 4, an optical fiber 20 oriented in fiber bore 8 in accordance with a preferred method of the present invention is shown. Optical fiber 20 has a core 22 and a cladding 24. While the center of the core 22 may also be offset relative to the outer surface of the fiber 20, the assumption made herein, unless otherwise indicated, is that the core/cladding offset is zero or negligible. The central axis 26 of the optical fiber is offset from the central axis 12 of the bore by a distance 28. This distance is known or can be measured for each ferrule. This distance is referred to as the eccentricity or offset of the fiber within the bore. Because the inner diameter (about 125.0 to 126.0 microns) of the bore 8 is greater than the diameter of the fiber 20 (about 125 microns), the fiber may be positioned in the bore to offset, either partially or totally, the concentricity or eccentricity of the bore relative to the outer surface of the ferrule.

As illustrated in FIGS. 3 & 4, for example, a fiber 20 is oriented downward within the bore 8 of the ferrule 2 according to a preferred embodiment of the present invention so that the effect of the eccentricity of the bore relative to the ferrule on the overall eccentricity of the fiber optic connector 3 is offset by the eccentricity 28 of the fiber relative to the bore. That is, with the thinnest portion of the ferrule 2 oriented upward (and therefore the center of the fiber bore 8 being above the center of the ferrule 2), the fiber 20 is positioned downward in the fiber bore 8 so that the central longitudinal axis 26 of the fiber 20 is generally concentric with the central longitudinal axis 10 of the ferrule. The offset of the center of the fiber from the center of the ferrule is determined by:

$$\text{Offset} = \epsilon_{ec} - \epsilon_{fit} \pm \epsilon_{cc} \quad \text{(Equation 1)}$$

where $\epsilon_{ec}$ is the error in eccentricity of the ferrule in micrometers; $\epsilon_{fit}$ is the difference between the inner diameter of the ferrule and the outer diameter of the optical fiber in micrometers divided by two (to get eccentricity); and $\epsilon_{cc}$ is the eccentricity of the core relative to the cladding in the optical fiber in micrometers and it can be either subtracted or added depending on whether the eccentricity is rotated toward the top or the bottom. (As noted above, the eccentricity of the fiber core relative to the cladding is assumed to be zero). Preferably, this offset is less than or equal to 0.5, and in the most preferred embodiment the offset is less than or equal to 0.35.

Figure 5:
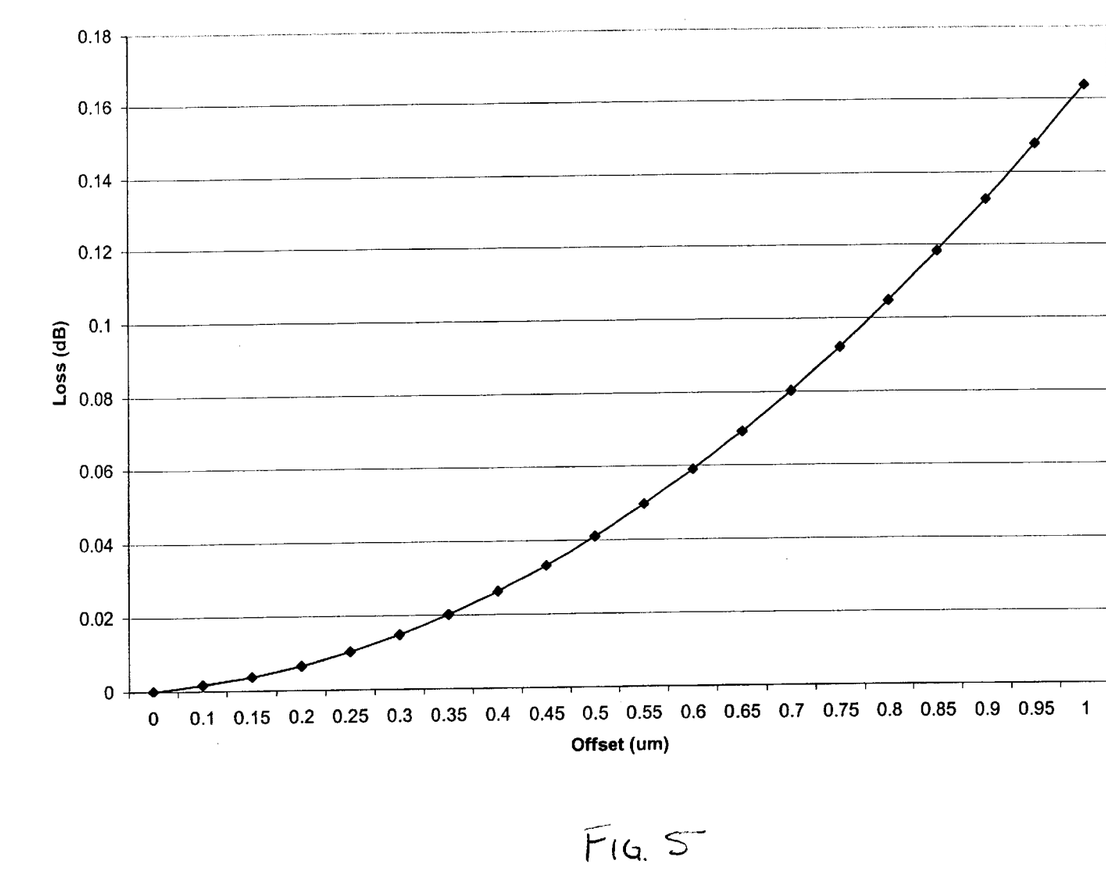
FIG. 5 depicts the loss of signal between two connectors as a function of optical fiber offset.

As can be seen in the graph depicted in FIG. 5, the insertion loss at a joining point of two ferrules is related to the distance between the centers of the two fibers. New technology requires that there be as little insertion loss as possible, certainly less than 0.2 dB, more preferably less than 0.1 dB, and most preferably less than 0.05 dB. In order to achieve these values, the distance between the cores of the fibers must be less than about 1.0 microns, and less than about 0.8 microns, and less than about 0.5 microns, respectively. In order to achieve these values in a mated pair of connectors, the offset of the center of the fiber core in each connector should be preferably less than 0.6 microns from the center of the ferrule, less than 0.4 microns in a more preferred embodiment, and less than 0.2 microns in the most preferred embodiment.

Figure 8:
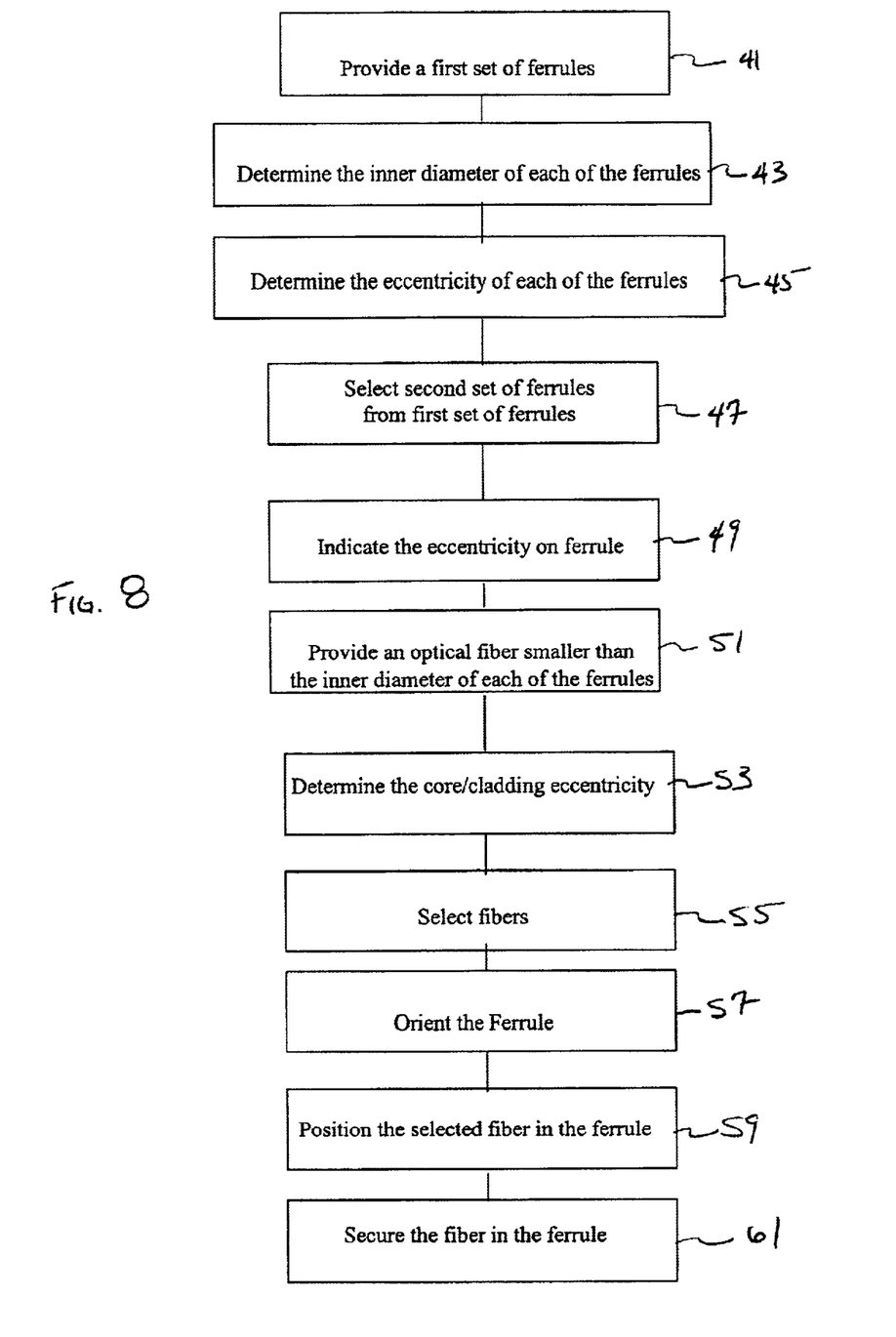
FIG. 8 is flow chart describing the method for making a population of intermatable ferrules according to the present invention.

The method of orienting a ferrule and a fiber relative to the ferrule will now be described in conjunction with FIG. 8. As shown in step 41, the ferrules 2 are preferably selected from a larger population of ferrules. Typically, the manufacture of ferrules does not lend itself to all ferrules having the desired or even a consistent concentricity. Additionally, the inner diameter of the ferrule bores 8 may also have a given distribution. The present invention is directed to matching the inner diameters with the concentricities in order to offset or cancel the inaccuracies of the ferrule manufacturing process.

Figure 6:
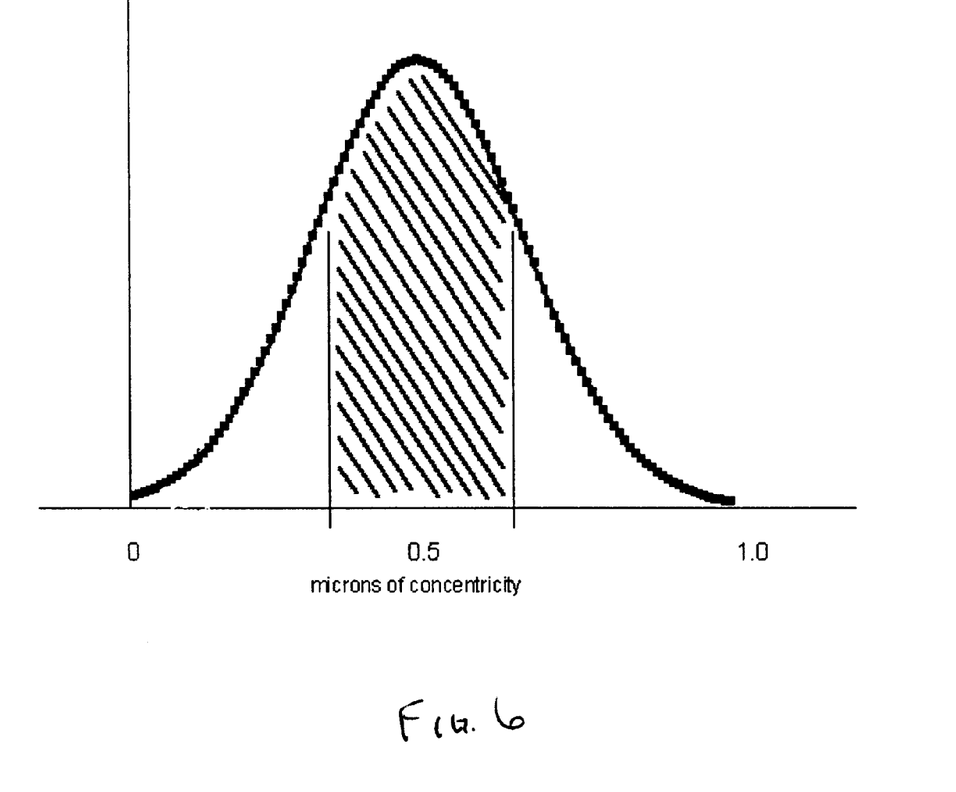
FIG. 6 depicts a representative distribution of concentricities for ferrules having a predetermined inner diameter.
Figure 7:
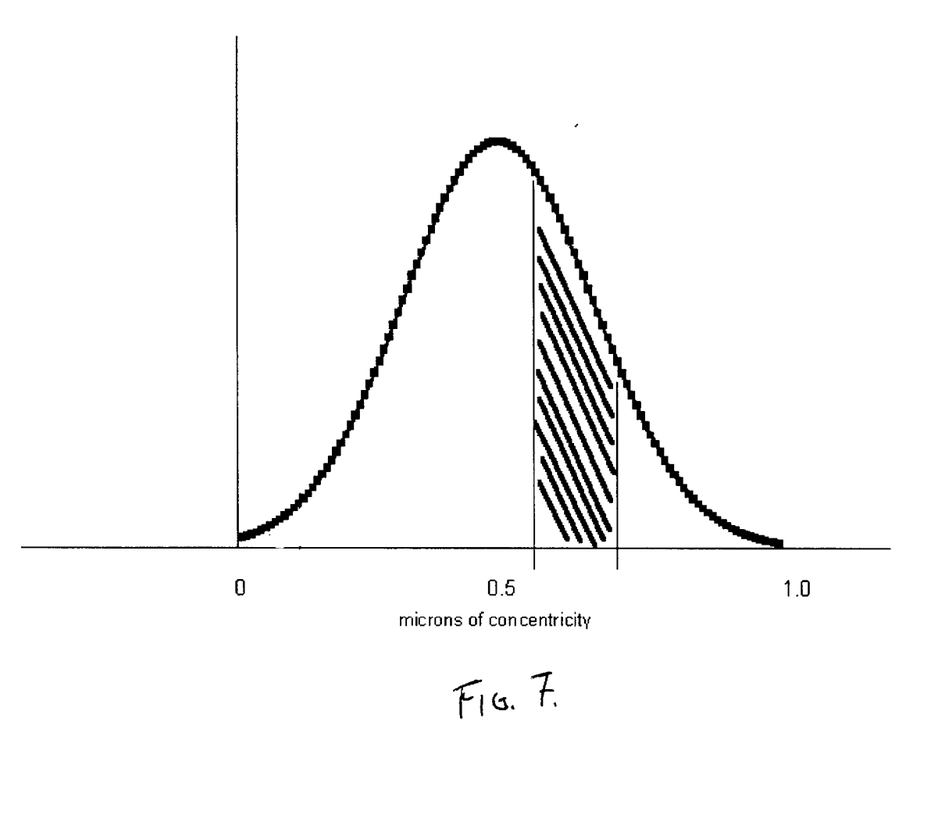
FIG. 7 depicts another representative distribution of concentricities for ferrules having another predetermined inner diameter.

Because a population of ferrules will have a distribution of fiber bore inner diameters, there is a need to match the inner diameters to the concentricities. For example, if the population has an inner bore distribution of 125.2–125.8 µm, the majority of the ferrules will have an inner diameter of about 125.5 µm (assuming a Gaussian distribution). Assuming the optical fibers inserted in the ferrule are 125 µm in diameter, the majority of the ferrules will have 0.5 µm clearance between the fiber and the inner surface of the fiber bore. Within that population of ferrules (125.2–125.8 µm), there is a population of ferrules that has a concentricity distribution centered around 0.5 µm. See FIG. 6. Naturally, the closer the concentricity matches the difference in the fit between the inner diameter of the ferrule and the fiber, the closer the center of the optical fiber is to the center of the ferrule. By choosing the ferrules in this manner, the concentricity error can then be offset by orienting the fiber in a direction opposite the direction of the concentricity. The same can be done with other populations or subpopulations of ferrules to allow as many ferrules to be used as possible. For example, ferrules with an inner diameter distribution of 125.5–126 µm (mean of 125.75 µm) should have a concentricity of 0.75 µm to allow for cancellation of errors if the fiber has a 125 µm diameter. See FIG. 7. Thus, a population of ferrules (those with the concentricities and inner diameters give the least amount of error) can be selected from a larger set of ferrules to provide the required offset.

In all cases, there will be some ferrules in the chosen population that will have a larger and a smaller inner diameter, so the errors may not always cancel exactly. However, the overall effect is that the sum of the errors for a connector (or ferrule and fiber) will be less than 0.6 µm, more preferably less than 0.4 µm, and most preferably less than 0.2 µm. Again following the steps shown in FIG. 8, at step 43 all ferrules are examined and the inner diameter of each ferrule is determined. At step 45, the eccentricity of each of the ferrules is determined. The steps of determining the inner diameter (step 43) and the eccentricity (step 45) can be reversed, or performed simultaneously and still come within the scope of the present invention. Then, at step 47, only the ferrules (second set) that have a corresponding inner diameter and eccentricity that fall within the desired ranges are selected to be used.

Then, at indicating step 49, the ferrules are marked with the direction of eccentricity. In the preferred embodiment, the ferrules are inserted into a ferrule holder with a key indicating that the thinnest portion 16 of the ferrule is oriented upward, although it could be oriented in any direction relative to the ferrule holder. Additionally, the indication can also be a mark on the ferrule, writing on the ferrule, or a physical feature on the ferrule or ferrule hardware (i.e., a key, a groove, etc.) At step 51, an optical fiber is provided. In the preferred embodiment, the fiber is a 125 micron fiber from Coming Incorporated, although any manufacturer, type, or size of fiber that corresponds to the ferrules may be used.

In the event that the core/cladding eccentricity is important, the core/cladding eccentricity is determined at step 53. When the core/cladding eccentricity is determined, the preferred fibers are those with less than 0.1 microns offset, more preferably less than 0.05 microns, and most preferably less than 0.025 microns. The fiber can be marked to indicate the eccentricity and the amount, if so desired, to aid in the selection and placement of fibers in the subsequent steps. If the fiber meets the criteria for core/cladding eccentricity or is of the appropriate outer diameter (i.e., not too large or too small), then in step 55 the fiber is selected for step 59.

In step 57, the ferrule is oriented in preparation for the positioning of the fiber within the bore 8. Since, in the preferred embodiment, the ferrule is oriented within the connector in a predetermined orientation (the eccentricity of the ferrule is generally oriented upward), the ferrule is oriented prior to the insertion of the fiber. As noted above, the ferrule can be oriented in any orientation within the connector and still have the center of the fiber close to the center of the ferrule. It should be noted that while the orientation is illustrated here in step 57, it can be done at any time after the indicating step (step 49) and before the positioning of the fiber in the ferrule bore (step 59).

In step 59, the fiber is positioned within the bore 8. The fiber is positioned such that the center of the fiber core will be closest to the central axis of the ferrule. Again, if the core/cladding eccentricity is important, then the fiber may be rotated within the fiber bore 8 to assist in that placement. In the preferred embodiment where the eccentricity is oriented in an upwards direction, the fiber is typically positioned at the bottom of the fiber bore 8 as shown in FIGS. 3 & 4. With the proper choice of ferrules (the corresponding eccentricity and inner diameters), the fiber center will preferably have an offset from the center of the ferrule of 0.6 microns, more preferably 0.4 micron, and most preferably 0.2 microns. Then in step 61, the fiber is then secured in the fiber bore 8, with epoxy, UV adhesives, cyanoacrylates, etc., although any type of securing will do.

The method results in a population of ferrules (or connectors when assembled) with an insertion loss of less than 0.2 dB, more preferably 0.1 dB, and most preferably 0.05 dB.

In the drawings and specification there has been set forth a preferred method of the invention and, although specific terms are employed, the terms are used in a generic and descriptive sense only and not for the purpose of limiting the scope of the invention being set forth in the following claims.

That which is claimed is:

1. A method of making a population of intermatable ferrules, each of the ferrules being mounted on an optical fiber, and each ferrule having an outer surface and defining a longitudinal bore, comprising the steps of:

selecting from a first set of ferrules a second set of ferrules each having an inner diameter within a predetermined range of inner diameters and an eccentricity of the bore relative to the outer surface of about one-half the difference between the mean of the range of inner diameters and the diameter of the optical fiber;

providing an optical fiber, the optical fiber having an outer diameter smaller than the inner diameter of the ferrule; and positioning an optical fiber in the bore of each of the second set of ferrules on the basis of the eccentricity so the optical fiber is generally concentric relative to the outer surface of the ferrule.

2. The method of making a population of ferrules of claim 1 further comprising the step of indicating on each ferrule in the second set of ferrules the eccentricity of each ferrule.

3. The method of making a population of ferrules of claim 1 further comprising the step of inserting each ferrule in the second set of ferrules into a connector with the eccentricity oriented in a predetermined orientation relative to the connector.

4. The method of making a population of ferrules of claim 1 wherein each optical fiber and each ferrule in the second set of ferrules has a center and the step of positioning the optical fiber comprises orienting the optical fiber in the bore of each of the ferrules such that the center of the optical fiber has an offset from the center of the ferrule that is less than a predetermined value.

5. The method of making a population of ferrules of claim 4 wherein the predetermined value is less than 0.6 micrometers.

6. The method of making a population of ferrules of claim 4 wherein the predetermined value is less than 0.4 micrometers.

7. The method of making a population of ferrules of claim 4 wherein the predetermined value is less than 0.2 micrometers.

8. The method of making a population of ferrules of claim 7 further comprising the step of orienting the ferrule in a predetermined direction based on the eccentricity prior to the step of positioning the optical fiber.

9. The method of making a population of ferrules of claim 8 wherein the ferrule is oriented within 90° of the predetermined direction.

10. The method of making a population of ferrules of claim 8 wherein the ferrule is oriented within 30° of the predetermined direction.

11. The method of making a population of ferrules of claim 8 wherein the ferrule is oriented within 5° of the predetermined direction.

12. The method of making a population of ferrules of claim 8, wherein the ferrule has a location at which the distance between the outer surface of the ferrule and an inner surface of the bore is at a minimum, and wherein the step of orienting the ferrule in a predetermined direction includes orienting the ferrule so that the location of that minimum distance is oriented in the predetermined direction.

13. The method of making a population of intermatable ferrules of claim 1, further comprising the step of selecting an optical fiber to be positioned in the bore, the optical fiber having a core and a cladding, the core of the selected fiber having an eccentricity relative to the cladding less than a predetermined amount.

14. The method claim 13, further comprising the step of rotating the fiber relative to the ferrule to orient the fiber core relative to the center of the ferrule.

15. The method claim 13, wherein the predetermined amount is less than 0.1 micrometer.

16. The method claim 13, wherein the predetermined amount is less than 0.05 micrometers.

17. The method claim 13, wherein the predetermined amount is less than 0.025 micrometers.

18. A population of ferrules made according to the method of claim 1, wherein any two ferrules from the population when mated have an insertion loss of less than 0.2 dB.

19. A population of ferrules made according to the method of claim 1, wherein any two ferrules from the population when mated have an insertion loss of less than 0.1 dB.

20. A population of ferrules made according to the method of claim 1, wherein any two ferrules from the population when mated have an insertion loss of less than 0.05 dB.

21. A population of independent, intermatable ferrules comprising:
   a plurality of cylindrical ferrules, each ferrule having a center, an outer surface and a longitudinal bore, the bore defining an inner diameter and a cylindrical wall of varying thickness extending between the inner diameter and the outer surface of the ferrule; and
   a plurality of optical fibers, each optical fiber having a core and a cladding, the core having a center and the cladding having an outer diameter, the optical fiber mounted in the bore of one of the ferrules against a portion of the wall having the greatest thickness, whereby the center of the optical fiber core is positioned within a predetermined range of the center of the ferrule;
   wherein each of the ferrules has an inner diameter within a range of inner diameters and an eccentricity of the bore relative to the outer surface of about one-half the difference between the mean of the range of inner diameters and the diameter of the optical fiber such that the optical fiber is generally concentric relative to the outer surface of the ferrule when the optical fiber in mounted in the bore.

22. The population of ferrules of claim 21 wherein the predetermined range is between 0.4 and 0.6 micrometers.

23. The population of ferrules of claim 21, wherein the predetermined range is between 0.2 and 0.4 micrometers.

24. The population of ferrules of claim 21, wherein the predetermined range is less than 0.2 micrometers.

25. The population of ferrules of claim 21, wherein the predetermined range is further divided into three different ranges, a first range being between 0 and 0.2 micrometers, a second range being between 0.2 and 0.4 micrometers, and a third range being between 0.4 and 0.6 micrometers.

26. A population of independent, intermatable ferrules comprising:
   a first plurality of ferrules;
   a second plurality of ferrules selected from the first plurality of ferrules, each of the second plurality of ferrules having an outer surface and a longitudinal bore, the bore defining an inner diameter within a range of inner diameters and an eccentricity of the bore relative to the outer surface of about one-half the difference between the mean of the range of inner diameters and the diameter of the optical fiber; and
   an optical fiber mounted in the bore of each of the second plurality of ferrules generally concentric relative to the outer surface of the ferrule;
   whereby when any two ferrules of the second plurality of ferrules are mated in a connector sleeve, the centers of the optical fibers are offset less than a predetermined value relative to one another.

27. The population of intermatable ferrules of claim 26, wherein each of the ferrules has an inner diameter and the optical fiber mounted therein has an outer diameter, and the predetermined value follows the equation: $\epsilon ec - \epsilon fit \leq 0.5$,
   where $\epsilon ec$ is the error in eccentricity of the ferrule in micrometers and $\epsilon fit$ is the difference between the inner diameter of the ferrule and the outer diameter of the optical fiber in micrometers divided by two.

28. The population of intermatable ferrules of claim 26, wherein each of the ferrules has an inner diameter and the optical fiber mounted therein has an outer diameter, and the predetermined value follows the equation: $\epsilon ec - \epsilon fit \leq 0.35$, where $\epsilon ec$ is the error in eccentricity of the ferrule in micrometers and $\epsilon fit$ is the difference between the inner diameter of the ferrule and the outer diameter of the optical fiber in micrometers divided by two.

29. The population of intermatable ferrules of claim 26, wherein each of the ferrules has an inner diameter and the optical fiber mounted therein has a core and a cladding, the cladding having an outer diameter, and the predetermined value follows the equation:

$$\epsilon ec - \epsilon fit \pm \epsilon cc \leq 0.5,$$

where $\epsilon ec$ is the error in eccentricity of the ferrule in micrometers; $\epsilon fit$ is the difference between the inner diameter of the ferrule and the outer diameter of the optical fiber in micrometers divided by two; and $\epsilon cc$ is the eccentricity of the core relative to the cladding in the optical fiber in micrometers.

30. The population of intermatable ferrules of claim 26, wherein each of the ferrules has an inner diameter and the optical fiber mounted therein has a core and a cladding, the cladding having an outer diameter, and the predetermined value follows the equation:

$$\epsilon ec - \epsilon fit \pm \epsilon cc \leq 0.35,$$

where $\epsilon ec$ is the error in eccentricity of the ferrule in micrometers; $\epsilon fit$ is the difference between the inner diameter of the ferrule and the outer diameter of the optical fiber in micrometers divided by two; and $\epsilon cc$ is the eccentricity of the core relative to the cladding in the optical fiber in micrometers.

31. A population of independent, intermatable ferrules comprising;

a first plurality of ferrules, a second plurality of ferrules selected from the first plurality of ferrules, each of the second plurality of ferrules having an outer surface and a longitudinal bore, the bore defining an inner diameter within a range of inner diameters and an eccentricity of the bore relative to the outer surface of about one-half the difference between the mean of the range of inner diameters and the diameter of the optical fiber; and an optical fiber mounted in the bore of each of the second plurality of ferrules generally concentric relative to the outer surface of the ferrule;

whereby when any two ferrules of the second plurality of ferrules are mated in a connector sleeve, the mating point has a signal loss less than predetermined value.

32. The population of intermatable ferrules of claim 31, wherein the predetermined value is less than 0.2 dB.

33. The population of intermatable ferrules of claim 31, wherein the predetermined value is less than 0.1 dB.

34. The population of intermatable ferrules of claim 31, wherein the predetermined value is less than 0.05 dB.

* * * * *